US010690236B2

(12) United States Patent
Elberling et al.

(10) Patent No.: US 10,690,236 B2
(45) Date of Patent: Jun. 23, 2020

(54) COLUMN-MOUNTED ELECTRONIC TRANSMISSION SHIFTER

(71) Applicant: Ford Global Technologies, LLC, Dearborn, MI (US)

(72) Inventors: Eric Elberling, Milford, MI (US); Mark Edward Zyskowski, Plymouth, MI (US); Erik William Soderlind, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/834,244

(22) Filed: Dec. 7, 2017

(65) Prior Publication Data

US 2019/0178368 A1     Jun. 13, 2019

(51) Int. Cl.
| F16H 59/10 | (2006.01) |
| F16H 59/02 | (2006.01) |
| F16H 61/22 | (2006.01) |
| F16H 61/24 | (2006.01) |
| B60K 20/06 | (2006.01) |
| F16H 59/50 | (2006.01) |
| F16H 1/20  | (2006.01) |

(52) U.S. Cl.
CPC ........... F16H 59/105 (2013.01); B60K 20/06 (2013.01); F16H 59/0278 (2013.01); F16H 61/22 (2013.01); F16H 61/24 (2013.01); F16H 1/203 (2013.01); F16H 59/50 (2013.01); F16H 2061/247 (2013.01)

(58) Field of Classification Search
CPC ................. F16H 59/105; F16H 59/081; F16H 2059/0295; F16H 2061/223; F16H 2061/243; F16H 2061/241; F16H 2061/247; F16H 2061/242; F16H 2061/245; F16H 61/22; B60K 20/06
See application file for complete search history.

(56) References Cited

U.S. PATENT DOCUMENTS

| 5,094,115 | A | * | 3/1992 | Michihira | ............... | B60K 37/06 |
| | | | | | | 74/335 |
| 5,156,243 | A | * | 10/1992 | Aoki | ...................... | B60K 20/06 |
| | | | | | | 192/218 |
| 6,289,756 | B1 | * | 9/2001 | Roemen | ................ | F16H 59/105 |
| | | | | | | 74/335 |
| 6,295,887 | B1 | * | 10/2001 | DeJonge | ................ | B60K 37/06 |
| | | | | | | 74/473.3 |

(Continued)

FOREIGN PATENT DOCUMENTS

DE        10302050 A1    7/2004

*Primary Examiner* — Daniel D Yabut
(74) *Attorney, Agent, or Firm* — Vincent Mastrogiacomo; Brooks Kushman P.C.

(57) ABSTRACT

A column-mounted shifter for a transmission includes a housing adapted to mount on a steering column and a shaft supported for rotation within the housing. A lever is operably coupled to the shaft and extends radially therefrom. The lever is pivotal between a series of positions corresponding to a series of modes of the transmission. Rotation of the lever causes rotation of the shaft within the housing. A sensor is configured to sense rotation of the shaft and output a signal indicative of the position of the lever. An actuator arrangement is connectable with the shaft and is configured to rotate the lever from one of the positions to another of the positions.

18 Claims, 5 Drawing Sheets

(56) References Cited

U.S. PATENT DOCUMENTS

| | | | |
|---|---|---|---|
| 7,028,545 B2 | 4/2006 | Gandel et al. | |
| 7,278,526 B2 | 10/2007 | Vermeersch et al. | |
| 2015/0152958 A1* | 6/2015 | Watanabe | F16H 59/08 |
| | | | 74/473.12 |
| 2015/0167827 A1* | 6/2015 | Fett | F16H 59/08 |
| | | | 74/473.3 |
| 2016/0138704 A1* | 5/2016 | Watanabe | F16H 59/08 |
| | | | 74/473.23 |
| 2016/0312882 A1* | 10/2016 | Heo | F16H 59/08 |
| 2018/0223991 A1* | 8/2018 | Royer | F16H 61/22 |
| 2018/0257488 A1* | 9/2018 | Mayville | F16H 59/50 |
| 2018/0363775 A1* | 12/2018 | Watanabe | F16H 61/24 |

\* cited by examiner

COLUMN-MOUNTED ELECTRONIC TRANSMISSION SHIFTER

TECHNICAL FIELD

This disclosure relates to the field of automatic transmissions for motor vehicles, and more particularly, relates to column-mounted shifters for selecting between modes of the transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Most vehicles today have an automatic transmission including several modes such as PARK, REVERSE, NEUTRAL, and DRIVE. The driver selects between the different modes using an input, e.g., a shifter, located in the passenger cabin. The transmission includes clutches and brakes operable to create one or more gear ratios associated with one or more of the modes. For example, the transmission may include five forward-drive gear ratios associated with DRIVE, a single reverse gear ratio associated with REVERSE, and one or more neutral states associated with NEUTRAL and PARK.

Figure 8:
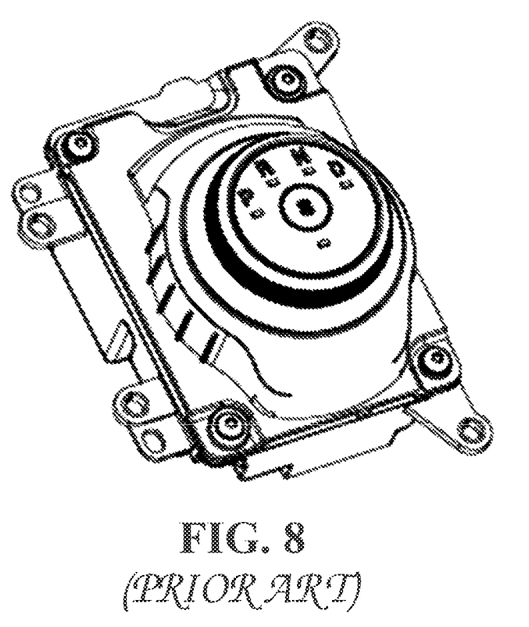
FIG. 8 is an isometric view of a prior-art rotary gear shifter.

Referring to FIG. 8, a rotary gear shifter includes a dial that is turned to move the shifter between positions, such as PRND. The shifter is in electronic communication with a transmission and outputs a signal indicating a position of the dial. A controller associated with the transmission and the shifter commands the transmission to shift between various transmission modes according to the signal from the shifter. The shifter includes a mechanism for automatically rotating the dial when the position of the shifter is out of synchronization with the transmission.

SUMMARY

According to an embodiment, a column-mounted shifter for a transmission includes a housing adapted to mount on a steering column and a shaft supported for rotation within the housing. A lever is operably coupled to the shaft and extends radially therefrom. The lever is pivotal between a series of positions corresponding to a series of modes of the transmission. Rotation of the lever causes rotation of the shaft within the housing. A sensor is configured to sense rotation of the shaft and output a signal indicative of the position of the lever. An actuator arrangement is connectable with the shaft and is configured to rotate the lever from one of the positions to another of the positions.

According to another embodiment, a column-mounted transmission shifter includes a shaft and a lever coupled to the shaft to extend radially therefrom. The lever and shaft are pivotal between transmission-mode positions. A sensor is configured to sense rotation of the shaft and output a transmission-mode signal. An actuator arrangement is configured to pivot the lever from one of the positions to another of the positions.

According to yet another embodiment, a column-mounted shifter system for a transmission includes a shifter assembly having a lever coupled to and extending radially from a shaft. The lever is pivotal between at least PARK and DRIVE positions. An actuator is configured to pivot the lever from at least DRIVE to PARK. A controller is programmed to, responsive to the lever being in the DRIVE position and a driver door being open, rotate the lever to the PARK position via the actuator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
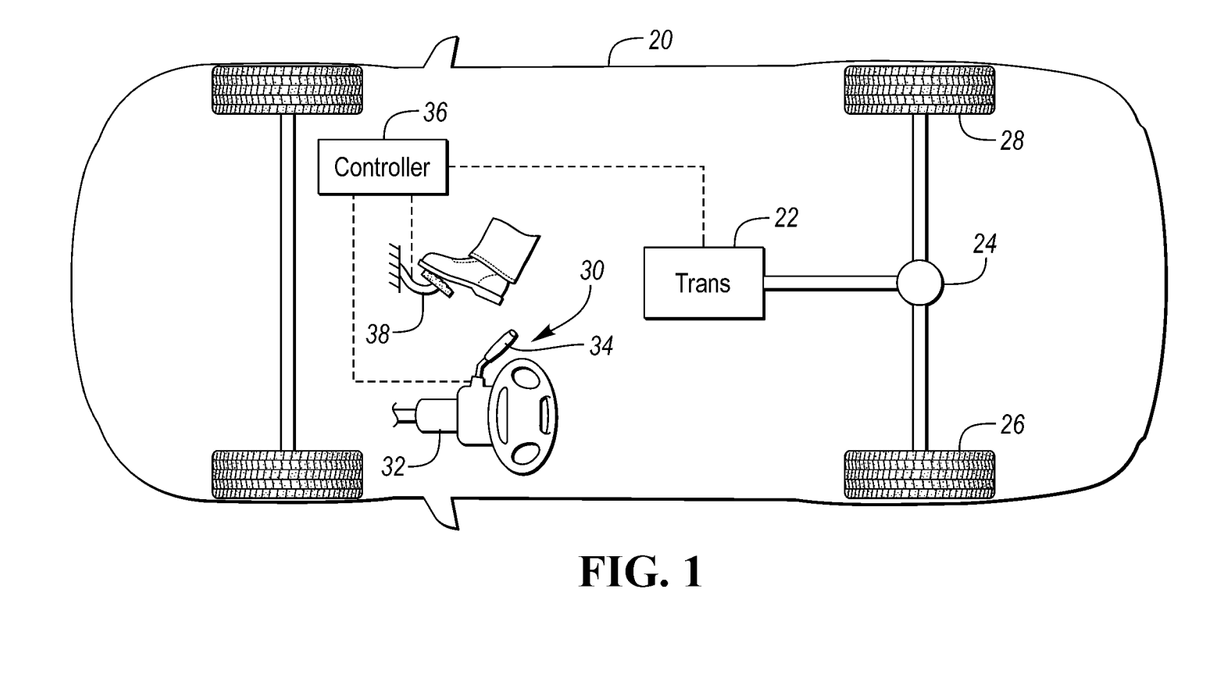
FIG. 1 is a schematic diagram of a vehicle.

Referring to FIG. 1, an example vehicle 20 includes a powertrain having an engine (not shown) and a transmission 22. While illustrated as rear-wheel drive, the teachings of this disclosure are equally applicable to front-wheel drive, four-wheel drive, or all-wheel drive vehicles. The engine generates mechanical power. The transmission 22 transmits the power to a differential 24 at a shaft speed suited to current vehicle needs, which may be faster or slower than the shaft speed at which the engine generates the power. The differential 24 reduces the shaft speed by a fixed final-drive ratio and transmits the power to the left and right driving wheels 26 and 28, allowing for slight speed differences between the wheels as the vehicle turns a corner.

The transmission 22 may include a plurality of modes such as PARK, REVERSE, NEUTRAL, and DRIVE. The transmission 22 may be switched between these modes by a column-mounted gear shifter assembly 30. The shifter assembly 30 is mounted to the steering column 32. The gear shifter 30 includes at least PARK, REVERSE, NEUTRAL, and DRIVE positions that correspond with the PARK, REVERSE, NEUTRAL, and DRIVE modes of the transmission, e.g., the transmission is shifted to DRIVE mode in response to the shifter being placed in the DRIVE position. The shifter assembly 30 includes a lever 34 for actuating the gear shifter between the various positions. A driver manually operates the lever 34 and selects a desired mode of the transmission by pivoting the lever 34 about a pivot axis that may be generally parallel to the steering column 32.

The shifter assembly 30 may be an electronic shifter (e-shifter) that is electronically connected to the transmission 22 rather than mechanically via a linkage or cable. The gear shifter 30 may be in electronic communication with the transmission 22 via a vehicle controller 36. The controller 36 may be a vehicle-based computing system including one or more controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller 36 may communicate with other vehicle systems and controllers over one or more wired or wireless vehicle connections using common bus protocols (e.g., CAN and LIN). Used herein, reference to "a controller" refers to one or more controllers.

The shifter assembly 30 includes a sensor that is in electronic communication with the controller 36. The sensors are configured to sense an angular position, i.e., rotation, of the gear shifter 30 and output a signal to the controller 36 indicative of the angular position. The controller 36 is programmed to receive the angular-position signal and determine the position of the lever 34. The controller is further programmed to command to the transmission 22 to the mode corresponding with the position of the shifter assembly 30.

The vehicle 20 includes a brake pedal 38 for controlling friction brakes. The brake pedal assembly includes a sensor in electronic communication with the controller 36 and is configured to output a signal indicating whether the brake pedal 38 is being applied. The gear shifter 30 may include a brake transmission shift interlock (BTSI) that prevents the gear shifter 30 from pivoting out of the PARK position when the brake is not applied. The BTSI may prevent shifting in other situations as well.

FIGS. 2 through 7 describe an example column-mounted e-shifter for use with the vehicle 20.

Figure 2:
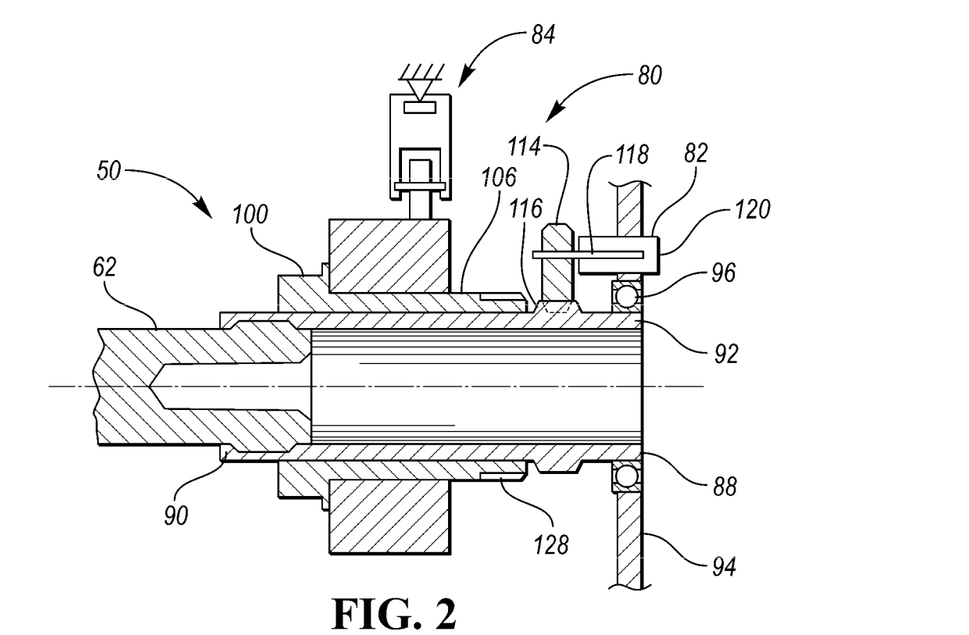
FIG. 2 is a side view, in cross section, of a column-mounted electronic gear shifter assembly.
Figure 3:
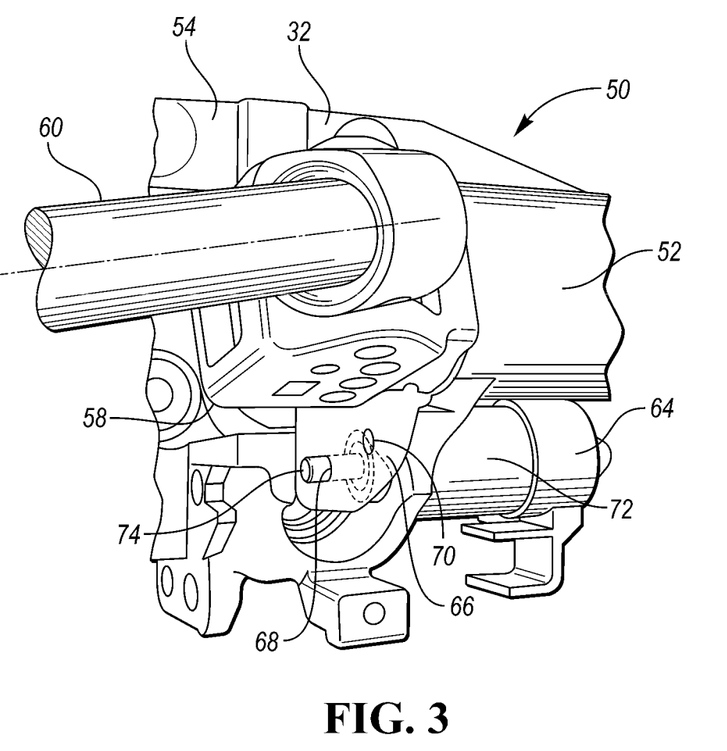
FIG. 3 is a fragmented side view of a front portion of the gear shifter.

Referring to FIGS. 2 and 3, an electronic column-mounted shifter assembly 50 is adapted to be mounted to a steering column such as steering column 32. The assembly 50 includes a housing 52 that may be attached to the steering column by a bracket 54. The housing 52 defines an interior that contains a majority of the components of the assembly 50 including a first shaft 62 supported for rotation within the housing 52. A forward end of the shaft 62 is connected to a clevis 58 that is located outside of the housing 52. A shift lever 60 is connected to the clevis 58 in order to operably couple the lever 60 and the shaft 62. A centerline of the shaft 62 defines the centerline of the shifter assembly 50. The lever 60 is pivotal about the centerline in order to switch between the PARK, NEUTRAL, REVERSE, and DRIVE positions. Pivoting of the lever 60 causes the shaft 62 to rotate.

A BTSI 64 is mounted to the housing 52 and is configured to prevent rotation of the lever 62 in select conditions. For example, the BTSI 64 may lock the lever 62 in PARK and/or NEUTRAL unless the brake pedal is depressed. A fin 66 may be attached to either the shaft 62 or the clevis 58 and rotates with the shaft 62. The fin 66 may define a park hole 68 and a neutral hole 70 that align with a pin 74 of the BTSI 64 when the lever 60 is rotated to the PARK and NEUTRAL positions, respectively. The BTSI 64 includes an actuator 72 configured to extend and retract the pin 74 in to and out of the holes 68, 70 to engage and disengage with the fin 66. When extended, the pin 74 prevents rotation of the lever 60.

Figure 5:
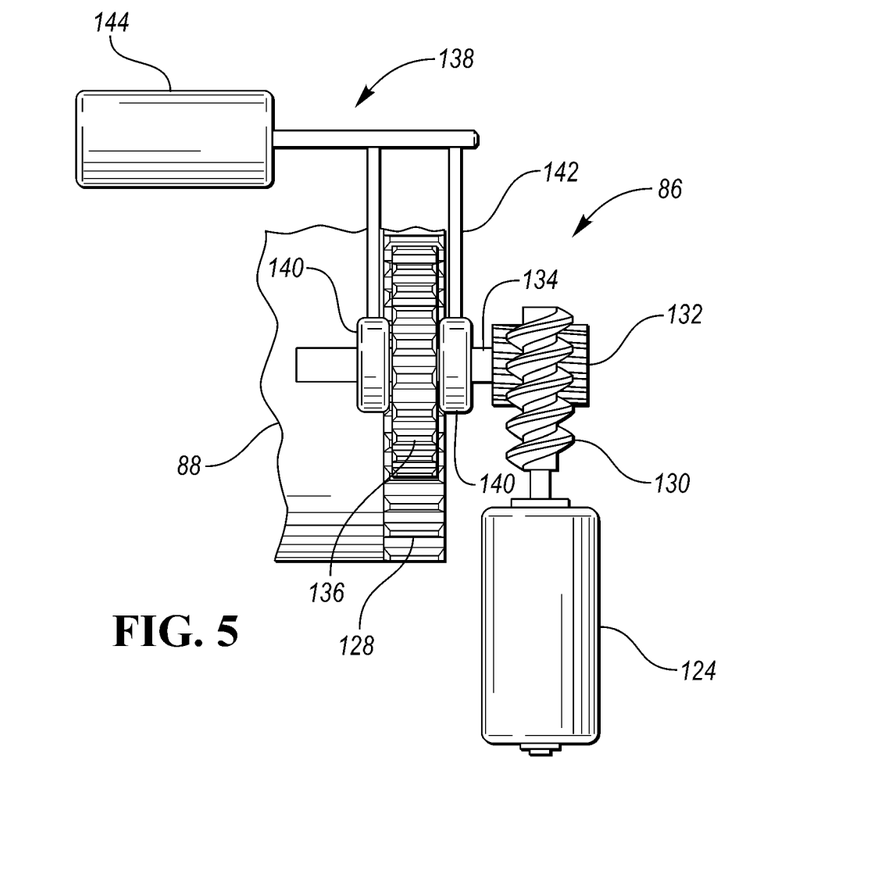
FIG. 5 is a schematic diagram of a return-to-park unit of the gear shifter.

The shifter assembly 50 includes a rear subassembly 80 that may contain a sensing unit 82, a detent mechanism 84, and a return-to-park unit 86 (FIG. 5). The rear subassembly 80 may include a second shaft 88 having a first end 90 coupled to the first shaft 62 by a spline or other type of connection. The second end 92 of the shaft 88 may be supported by a bearing 96 disposed in a rear wall 94 of the housing 52. The second shaft 88 is configured to rotate in unison with the first shaft 62 so that pivoting of the lever 60 causes the shaft 88 to rotate. In one or more embodiments, the first and second shafts may be replaced with a single shaft. A sleeve 100 may be received on the shaft 88 and rotationally fixed to the shaft. The sleeve 100 is optional and in other embodiments the features of the sleeve are formed on the shaft or are omitted.

Figure 4:
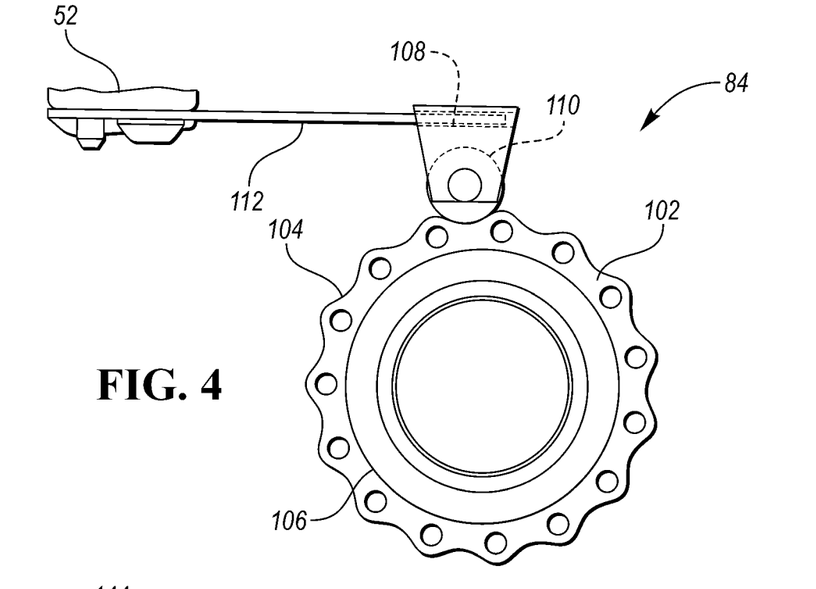
FIG. 4 is a back view detail of a detent mechanism of the gear shifter.

Referring to FIGS. 2 and 4, the shifter assembly 50 includes multiple, discrete positions (e.g., PARK, REVERSE, NEUTRAL, and DRIVE) to provide a feel similar to mechanical column-mounted shifters that drivers have become accustomed to. This is in contrast to typical console-mounted e-shifters that do not have discrete positions and are biased to return to a resting position once released by the driver. Since the shifter assembly 50 is an e-shifter, the detent mechanism 84 is provided to give the feel of discrete positions. The detent mechanism 84 may include a detent ring 102 received on a hub portion 106 of the sleeve 100. The detent ring 102 may be seated directly on the shaft 88 in embodiments that do not include the sleeve 100. The detent ring 102 defines a plurality of detent grooves 104 formed on the outer surface of the ring 102. A roller 110 of a detent applicator 108 engages with the grooves 104. The roller 110 is supported in the housing 52 by a spring 112 that biases the roller 110 into engagement with the detent ring 102. The roller 110 and the detent grooves 104 cooperate to provide rotational resistance of the shaft 88. The amount of resistance is dependent upon the sizing of the grooves 104 and the roller 110 as well as the stiffness of the spring 112. To rotate the lever 60, the driver must pull/push with sufficient force to compress the spring 112 allowing the roller 110 to move from one of the grooves 104 to another. This provides feedback to the driver notifying him that the lever 60 has been shifted from one transmission position to another, e.g., from PARK to REVERSE.

Referring back to FIG. 2, the sensing unit 82 measures rotation of the shaft 88 and outputs a signal to the controller 36 indicative of a shaft position. The controller 36 receives the signal and includes programming for translating the signal into a user-desired transmission mode, e.g., DRIVE, and commands the transmission 22 to shift to the user-desired transmission mode. In one or more embodiments, the sensing unit 82 includes a pinion 114 in meshing engagement with gear teeth 116 formed on the shaft 88 or fixed to the shaft by other means. The pinion 114 may be supported by a shaft 118 that extends into a sensor body 120 received in the rear wall 94 of the housing. Sensing elements are disposed in the sensor body 120 and are configured to measure rotation of the shaft 118. The sensor body 120 may include a connector that connects with a wire connected to the CAN bus. The sensing unit 82 may be a Hall sensor.

The advent of e-shifters allows the vehicle controller to shift between modes of the transmission independent of the position of the lever 60. This may allow the controller 36 to shift the transmission to PARK or NEUTRAL modes when it is evident that the driver inadvertently left the gear shifter in the REVERSE or DRIVE position.

The controller may be programmed to determine a user-intended transmission mode based on signals from various vehicle sensors and, responsive to the current transmission mode (or the lever position) not matching the user-intended mode, shift the transmission to the user-intended mode. For example, if the driver inadvertently leaves the shifter assembly in DRIVE, the controller is programmed to shift the transmission to PARK mode if the controller determines that the driver is intending to park the vehicle. In one embodiment, the controller is programmed to, in response to the vehicle speed being zero, the shifter assembly being in DRIVE or REVERSE, and a vehicle door being opened, shift the transmission from DRIVE to PARK. Of course, other trigger conditions may be used to prompt shifting from DRIVE to PARK and this is just one nonlimiting example.

If the controller shifts the transmission independent of the shifter assembly 50, then the shifter assembly 50 and the transmission become out of synchronization because the shifter assembly 50 remains in the driver-selected position unless acted upon by a force. The shifter assembly 50 includes the return-to-park unit 86 to re-synchronize the shifter assembly 50 and the transmission 22 by rotating the shaft 88 in order to place the lever 60 in the position corresponding with the current mode of the transmission. The return-to-park unit 86 may be referred to as an actuator arrangement. The shifter may include an indicator that lights up, e.g., blinks, to notify the driver that the shifter 50 and the transmission are not synchronized.

Referring to FIGS. 2 and 5, the return-to-park unit 86 includes an actuator 124 such as an electric motor. The actuator 124 is driveably connected to the shaft 88 so that the shaft 88 (and the lever 60) rotates in response to activation of the actuator 124. The sleeve 100 may define gear teeth 128 in meshing engagement with a gear train of the return-to-park unit 86. Alternatively, the gear teeth 128 may be formed on the shaft, or on a gear fixed to the shaft. The gear train may include a worm gear 130 fixed to a driveshaft 126 of the actuator 124. The worm gear 130 is in meshing engagement with a worm wheel 132 supported on a worm shaft 134. The worm shaft 134 may extend in an axial direction of the shifter assembly 50. A pinion 136 is supported on the worm shaft 134 and meshes with the gear teeth 128. The illustrated gear train is but one example and other arrangements are contemplated for driveably connecting the actuator 124 to the shaft 88.

Back driving of the actuator 124 is generally not desirable, and the return-to park unit 86 may include a slider assembly 138 configured to disengage the pinion 136 from the gear teeth 128 of the shaft 88 so that the actuator 124 is not backed driven when the driver actuates the lever 60. The pinion 136 may be attached to the worm shaft 134 by a spline connection allowing the pinion 136 to be axially slid into and out of meshing engagement with the gear teeth 128 by the slider assembly 138. The slider assembly 138 may include a pair of bearings 140 slidably received on the worm shaft 134. The bearings 140 are connected to an actuator 144, such as a solenoid, by an arm 142 that axially slides the bearings 140 to move the pinion 136 between a drive position in which the pinion 136 is engaged with the shaft 88 and a resting position in which the pinion is disengaged with the shaft 88. The return-to-park unit 86 may be configured so that the pinion 136 is normally in the resting position and is actuated to the driving position when the lever 60 needs to be pivoted.

Control logic or functions performed by controller 36 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 36. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 6:
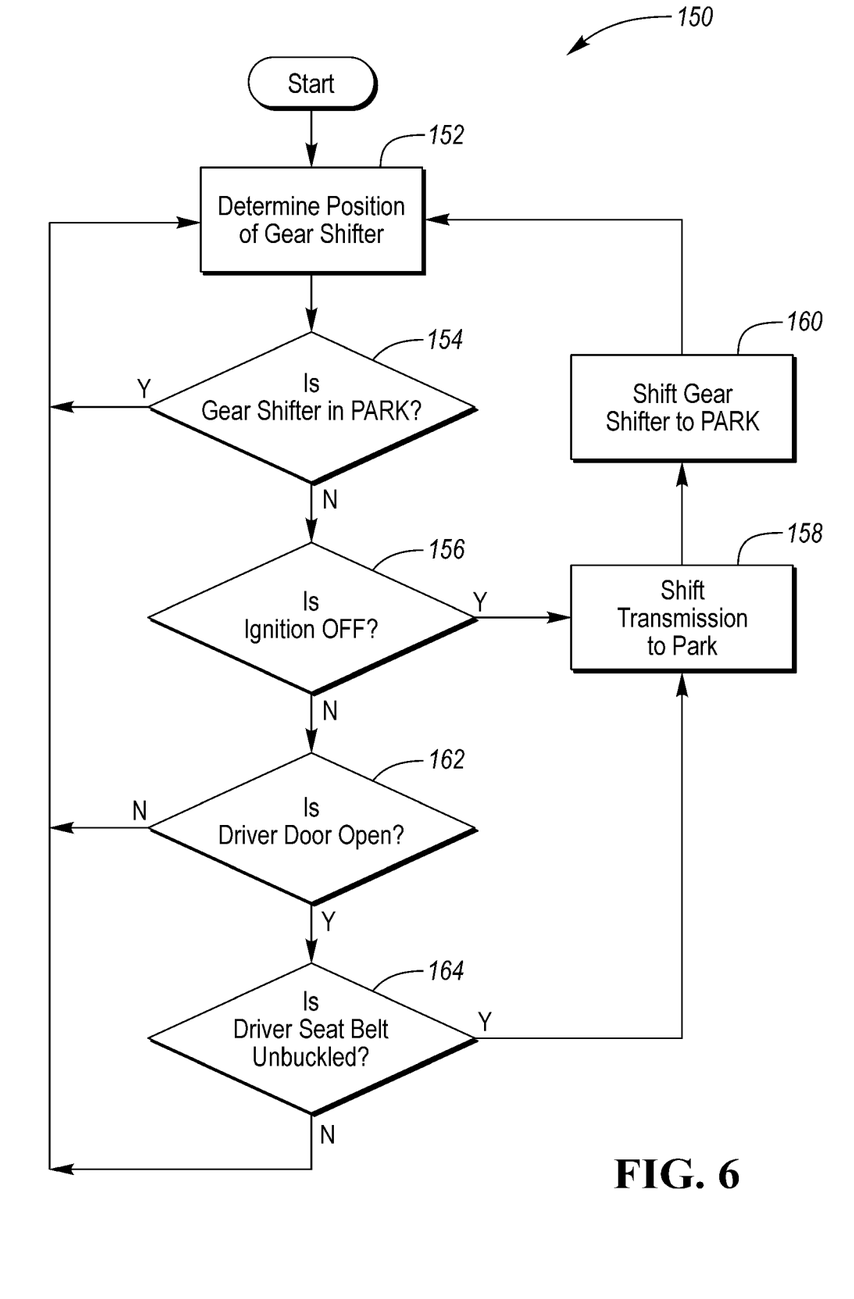
FIG. 6 is a flow chart of an algorithm for operating the return-to-park unit.

FIG. 6 is a flowchart 150 of an algorithm for controlling the return-to-park unit 86. At operation 152, the controller determines the current position of the gear shifter. At operation 154, the controller determines if the gear shifter is currently in the PARK position. If yes, control passes back to operation 152. If no, control passes to operation 156 and the controller determines if the ignition of the vehicle is OFF. If the ignition is OFF, the transmission should be in park as the driver is clearly indicating that they no longer wish to travel. If yes at operation 156, control passes to 158 and the controller commands the transmission to PARK mode. Control then passes to operation 160 where the controller energizes the return-to-park unit to actuate the gear shifter to PARK re-synchronizing the transmission and the gear shifter.

If the ignition is ON, control passes to operation 162, and the controller determines if the driver door is open. If no, no action is taken and control loops back to operation 152. If yes, the controller determines if the driver seatbelt is unbuckled at operation 164. The controller may be programmed to shift the transmission to PARK in response to the driver door being open and the driver seatbelt being unbuckled. Thus, if yes at operation 164, the transmission is commanded to PARK mode at operation 158. At operation 160, the controller energizes the return-to-park unit to rotate the gear shifter to PARK.

Figure 7:
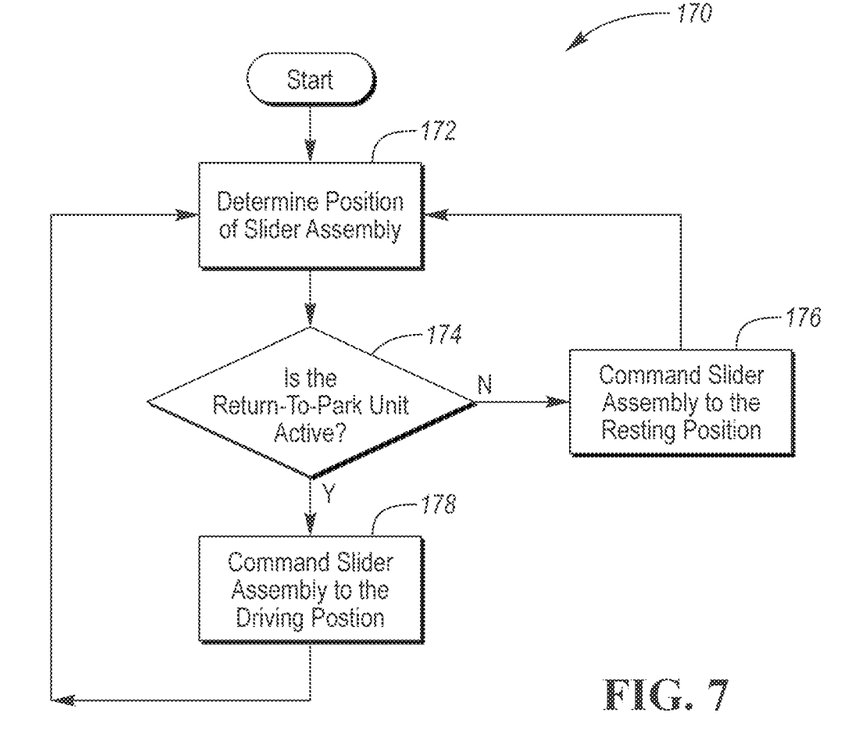
FIG. 7 is a flow chart of an algorithm for operating a slider assembly of the return-to-park unit.

FIG. 7 is a flowchart 170 of an algorithm for controlling the slider assembly of the return-to-park unit. As explained above, to prevent back driving of the actuator, the return-to-park unit may be normally disengaged with the shaft and actuated into engagement with the shaft when the gear shifter is out of synchronization with the transmission. At operation 172, the controller determines the position of the slider assembly. At operation 174, the controller determines if the return-to-park unit is active. If no, control passes to operation 176 and the slider assembly is commanded to the resting position, i.e., disengaged. If the slider assembly is already in the resting position at operation 176, no action may be taken. If yes at operation 174, the controller commands the slider assembly to the driving position, i.e., engaged at operation 178. The controls of FIG. 7 may be executed in conjunction with operation 168 of FIG. 6.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A column-mounted shifter for a transmission comprising:
   a housing adapted to mount on a steering column;
   a shaft supported for rotation within the housing;
   first gear teeth circumscribing and fixed to the shaft;
   second gear teeth circumscribing and fixed to the shaft, wherein the first and second gear teeth are axially spaced from each other;
   a lever including a proximal end operably coupled to the shaft, a distal end, and an elongate body extending radially, relative to the shaft, from the proximal end to the distal end, the lever being pivotal about the shaft between a series of positions corresponding to a series of modes of the transmission, wherein rotation of the lever causes rotation of the shaft within the housing;
   a detent ring circumscribing and fixed to the shaft, the detent ring including an outer circumferential surface defining detent grooves;
   a detent applicator radially outboard of the detent ring and including a roller engaging with the detent grooves;
   a resilient member connected between the detent applicator and the housing and configured to permit radial displace of the roller relative to the shaft;
   a sensor including a first gear meshing with the first gear teeth and configured to sense rotation of the first gear and output a signal indicative of the position of the lever; and
   an actuator arrangement connectable with the shaft and configured to rotate the lever from one of the positions to another of the positions, the actuator arrangement including:
      an actuator,
      a gear train that has a worm gear fixed to a driveshaft of the actuator,
      a second gear driveably connected to the worm gear and configured to mesh with the second gear teeth fixed to the shaft in one or more positions of the actuator arrangement
      a third actuator,
      a second shaft supporting the second gear, wherein the second gear is slidable on the second shaft, and
      an arm connected to the third actuator and engageable with the second gear, wherein the third actuator is configured to slide the second gear on the second shaft, via the arm, to engage and disengage the second gear with the second gear teeth.

2. The column-mounted shifter of claim 1, wherein the shaft includes a sleeve radially disposed between the shaft and the detent ring.

3. The column-mounted shifter of claim 2, wherein the sleeve defines the first gear teeth.

4. The column-mounted shifter of claim 1, wherein the second gear is actuatable between a first position in which the second gear meshes with the second gear teeth and a second position in which the second gear is disconnected from the second gear teeth.

5. The column-mounted shifter of claim 1, wherein the shaft includes a first shaft and a second shaft.

6. The column-mounted shifter of claim 1 further comprising:
   a fin fixed to the shaft at a location axially spaced from the first gear teeth and defining at least one hole that is oriented in an axial direction relative to the shaft; and
   a brake transmission shift interlock including a pin and a second actuator operable to extend and retract the pin in the axial direction, wherein the pin includes an extended position in which the pin is disposed in the hole to prevent pivoting of the lever and a retracted position in which the pin is not disposed in the hole.

7. The column-mounted shifter of claim 1, wherein resilient member includes a first end connected to the housing and a second end connected to the detent applicator.

8. A column-mounted transmission shifter comprising:
   a shaft;
   gear teeth fixed to the shaft;
   a lever coupled to the shaft to extend radially therefrom and pivotal between transmission-mode positions;
   a sensor configured to sense rotation of the shaft and output a transmission-mode signal; and
   an actuator arrangement configured to pivot the lever from one of the positions to another of the positions, the actuator arrangement including a gear connectable with the gear teeth, wherein the gear is actuatable between a first position in which the gear meshes with the gear teeth and a second position in which the gear is disconnected from the gear teeth, wherein the gear is supported on a second a shaft to be slidable between the first and second positions, and the actuator arrangement includes a slider assembly configured to slide the gear on the second shaft between the first and second positions, the slider assembly having a first actuator and a bearing connected to the actuator and engageable with the gear.

9. The column-mounted transmission shifter of claim 8, wherein the shaft includes a sleeve received on the shaft and the gear teeth are defined by the sleeve.

10. The column-mounted transmission shifter of claim 8, wherein the second shaft is rotationally fixed to the gear and is operable coupled to a second actuator configured to rotate the gear.

11. The column mounted transmission shifter of claim 8, wherein the shaft includes detent grooves and the shaft further comprises a detent applicator including a roller disposed against the detent grooves to provide rotational resistance on the shaft.

12. The column-mounted transmission shifter of claim 8, wherein the sensor includes a gear driveably connected to the shaft.

13. The column-mounted transmission shifter of claim 8 further comprising:
   a fin fixed to the shaft and defining at least one hole; and
   an interlock mechanism including a pin and an actuator operable to extend and retract the pin in an axial direction of the shaft, wherein the pin includes an extended position in which the pin is disposed in the hole to prevent pivoting of the lever and a retracted position in which the pin is not disposed in the hole.

14. The column-mounted shifter of claim 8 further comprising:
   a detent ring circumscribing and fixed to the shaft, the detent ring including an outer circumferential surface defining detent grooves; and
   a detent applicator radially outboard of the detent ring and including a roller engaging with the detent grooves.

15. The column-mounted shifter of claim 14 further comprising a resilient member connected between the detent applicator and the housing and configured to permit radial displace of the roller relative to the shaft.

16. The column-mounted shifter of claim 8 further comprising second gear teeth fixed to the shaft at a location axially spaced from the gear teeth, wherein the sensor includes a second gear meshing with the second gear teeth.

17. A column-mounted shifter system for a transmission comprising:
   a shifter assembly including:
   a shaft having gear teeth fixed thereto;
   a lever having an elongate body coupled to and extending radially from the shaft, the lever being pivotal, via rotation of the shaft, between at least PARK and DRIVE positions, and
   a first actuator arrangement having a shaft and a gear supported on the shaft and selectively meshing with the gear teeth, the first actuator arrangement being configured to rotate the gear to pivot the lever from DRIVE to PARK, and
   a second actuator arrangement configured to move the gear between an engaged position in which the gear meshes with the gear teeth and a disengaged position in which the gear does not mesh with the gear teeth, the second actuator arrangement including a bearing received on the shaft and engageable with the gear, an arm connected to the bearing, and an actuator connected to the arm and configured to move the arm to slide the bearing on the shaft; and
   a controller programmed to, responsive to the lever being in the DRIVE position and a driver door being open, (i) command the actuator to move the arm and slide the gear to the engaged position and (ii), in response to the gear being in the engaged position, command the first actuator arrangement to rotate the lever to the PARK position.

18. The column-mounted shifter system of claim 17, wherein the controller is further programmed to, responsive to the lever being in the DRIVE position and an ignition being OFF, command the first actuator arrangement to rotate the lever to the PARK position.

\* \* \* \* \*